United States Patent
Peng et al.

(10) Patent No.: US 9,762,818 B2
(45) Date of Patent: Sep. 12, 2017

(54) IMAGE SENSING DEVICE, SYSTEM AND METHOD THEREOF AND CHARGE SENSING DEVICE

(71) Applicant: Industrial Technology Research Institute, Hsinchu (TW)

(72) Inventors: Sheng-Yu Peng, Taipei (TW); Hui-Hsin Lu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/811,827

(22) Filed: Jul. 29, 2015

(65) Prior Publication Data
US 2016/0309104 A1    Oct. 20, 2016

(30) Foreign Application Priority Data
Apr. 20, 2015  (TW) ............... 104112562 A

(51) Int. Cl.
*H04N 5/32* (2006.01)
*H04N 5/355* (2011.01)
*H04N 5/374* (2011.01)
*H04N 5/3745* (2011.01)

(52) U.S. Cl.
CPC ............. *H04N 5/32* (2013.01); *H04N 5/355* (2013.01); *H04N 5/3745* (2013.01)

(58) Field of Classification Search
CPC ............. H04N 5/372; H04N 5/378; H04N 5/32–5/325; H01L 27/14658–27/14663; H01L 27/14676; H01L 27/308; G06T 2207/10116–2207/10128
See application file for complete search history.

(56) References Cited

U.S. PATENT DOCUMENTS

| | | | | |
|---|---|---|---|---|
| 5,883,830 | A | * | 3/1999 | Hirt .......... H04N 5/37452 |
| | | | | 257/E27.133 |
| 6,952,227 | B2 | * | 10/2005 | Lee .......... H04N 3/155 |
| | | | | 250/208.1 |
| 7,323,692 | B2 | | 1/2008 | Rowlands et al. |

(Continued)

FOREIGN PATENT DOCUMENTS

JP      H10284708      10/1998

OTHER PUBLICATIONS

Yanjun Ma, et al., "Reliability of pFET EEPROM With 70-Å Tunnel Oxide Manufactured in Generic Logic CMOS Processes," IEEE Transactions on Device and Materials Reliability, vol. 4, No. 3, Sep. 2004, pp. 353-pp. 358.

(Continued)

*Primary Examiner* — Jason Flohre
(74) *Attorney, Agent, or Firm* — Jiang Chyun IP Office

(57) ABSTRACT

An image sensing device, a system and a method thereof and a charge sensing device are provided. The image sensing device includes a charge sensor, a pixel circuit, a selector and a pulse generator. The charge sensor includes a sensing electrode and generates an induced charge on the sensing electrode. The pixel circuit transforms the induced charge into a pixel voltage. Before the image sensing device outputs the pixel voltage, the pixel circuit receives a pulse voltage from the pulse generator such that at least one transistor in the pixel circuit raises a hot carrier injection effect, so as to amplify the induced charge on the sensing electrode.

24 Claims, 3 Drawing Sheets

(56) References Cited

U.S. PATENT DOCUMENTS

| | | | |
|---|---|---|---|
| 8,253,212 | B2 | 8/2012 | Wronski et al. |
| 8,476,567 | B2* | 7/2013 | De Wit .............. H04N 5/37452 250/208.1 |
| 8,779,481 | B2 | 7/2014 | Janesick |
| 2004/0056176 | A1* | 3/2004 | Shizukuishi ........... H04N 5/374 250/208.1 |
| 2008/0135895 | A1* | 6/2008 | Lee ........................ H04N 5/363 257/290 |
| 2010/0085454 | A1* | 4/2010 | Goto .................... H04N 5/3532 348/294 |
| 2013/0092941 | A1 | 4/2013 | Den Boer et al. |
| 2013/0240745 | A1 | 9/2013 | Roos et al. |

OTHER PUBLICATIONS

Nader Safavian, et al., "Investigation of Gain Non-uniformities in the Two TFT, Current Programmed Amorphous Silicon Active Pixel Sensor for Fluoroscopy, Chest Radiography and Mammography Tomosynthesis Applications," Proc. SPIE 7622, Medical Imaging 2010: Physics of Medical Imaging, 76221N, Mar. 22, 2010, pp. 1 pp. 8.

M J Yaffe, et al., "X-ray detectors for digital radiography," Physics in Medicine and Biology, vol. 42, No. 1, Jan. 1997, pp. 1-pp. 39.

E. Kotter, et al., "Digital radiography with large-area flat-panel detectors," Eur Radiol., vol. 12, No. 10, Oct. 2002, pp. 2562-pp. 2570.

Mohammad Hadi Izadi, et al., "High dynamic range pixel architecture for advanced diagnostic medical x-ray imaging applications," J. Vac. Sci. Technol. A, vol. 24, No. 3, May/Jun. 2006, pp. 846-pp. 849.

Nader Safavian, et al., "Characterization of Current Programmed Amorphous Silicon Active Pixel Sensor Readout Circuit for Dual Mode Diagnostic Digital X-ray Imaging," SPIE 7258, Medical Imaging 2009: Physics of Medical Imaging, 725815, Mar. 13, 2009, pp. 725815-1-pp. 725815-9.

Mohammad H. Izadi, et al., "An a-Si Active Pixel Sensor (APS) Array for Medical X-ray Imaging," IEEE Transactions on Electron Devices, vol. 57, No. 11, Nov. 2010, pp. 3020-pp. 3026.

Chris Diorio, "A p-Channel MOS Synapse Transistor with Self-Convergent Memory Writes," IEEE Transactions on Electron Devices, vol. 47, No. 2, Feb. 2000, pp. 464-pp. 472.

M. Wronski, et al., "Scintillator high-gain avalanche rushing photoconductor active-matrix flat panel imager: Zero-spatial frequency x-ray imaging properties of the solid-state Sharp sensor structure," Medical Physics, vol. 39, No. 11, Nov. 2012, pp. 7102-pp. 7109.

Venkatesh Srinivasan, et al., "A Precision CMOS Amplifier Using Floating-Gate Transistors for Offset Cancellation," IEEE Journal of Solid-State Circuits, vol. 42, No. 2, Feb. 2007, pp. 280-p. 291.

"Office Action of Taiwan Counterpart Application", issued on Jun. 8, 2016, p. 1-p. 5.

* cited by examiner

IMAGE SENSING DEVICE, SYSTEM AND METHOD THEREOF AND CHARGE SENSING DEVICE

CROSS-REFERENCE TO RELATED APPLICATION

This application claims the priority benefit of Taiwan application serial no. 104112562, filed on Apr. 20, 2015. The entirety of the above-mentioned patent application is hereby incorporated by reference herein and made a part of this specification.

BACKGROUND OF THE DISCLOSURE

Field of the Disclosure

The disclosure relates to a sensing technique of a charge sensor, and particularly relates to an image sensing device, a system and a method thereof and a charge sensing device.

Description of Related Art

In view of today's various sensors, physical or chemical variations occurred therein are converted into a charge quantity, so as to convert the variations into a sensing signal. Such type of sensors is, for example, a phototransducer, a piezoelectric sensor or a biochemical reaction sensor. The phototransducer is sensitive to visible lights and other types of electromagnetic rays (for example, a gamma ray, an X-ray, an ultraviolet light, an infrared light, etc.) to correspondingly generate induced charges. Based on the induced charges generated by the phototransducer, an intensity variation of the electromagnetic ray is detected. Since a high-energy electromagnetic ray (for example, the gamma ray or the X-ray) can penetrate objects (for example, a human body), appearances or distribution of articles (for example, organs) in the object can be learned without spoiling the object. Therefore, a flat panel detector used for sensing the high-energy electromagnetic ray can be applied in many fields, particularly in radiation medicine, animal experiments, industrial non-destructive testing, etc., for image capturing.

In the field of medicine, it's not to expect that human body is irradiated with high-energy electromagnetic ray. Besides, the required intensity of high-energy ray, X-ray for example, is different under different fields and situations of image inspection scenarios. For example, body thickness or imaging position of a testee can be different such that the required intensity of X-ray should be adjusted accordingly. Therefore, the amount of induced charges sensed by the phototransducer in the flat panel detector can vary significantly and the post-end image readout circuit needs to perform proper adjustment to amplify the induced charge signal accordingly. As a result, an operator is required to properly process the image data obtained from the flat panel detector according to personal experiences to facilitate subsequent medical diagnosis or video output. Presently, flat panel detectors process the image data in the digital format with high resolution to obtain useful information. Consequently, the image readout circuits usually include high resolution data converters, which is very costly. Moreover, the flat panel detector is required to perform lots of processing, which hinder real-time image sensing.

SUMMARY OF THE DISCLOSURE

The disclosure is directed to an image sensing device, a system and a method thereof, in which a pulse voltage generated by a pulse generator is used to process and amplify an induced charge obtained by a charge sensor, so as to relax a resolution specification of a data converter in an image readout circuit, and decrease the cost of the image sensing device under different application situations.

The disclosure is directed to a charge sensing device, in which a pulse voltage generated by a pulse generator is used to adjust an amplification factor of an induced charge obtained by a charge sensor, so as to facilitate applying the charge sensing device to sensors of different fields.

An embodiment of the disclosure provides an image sensing device including a charge sensor, a pixel circuit, a selector and a pulse generator. The charge sensor includes a sensing electrode. The charge sensor generates an induced charge on the sensing electrode. The pixel circuit includes at least one transistor. The pixel circuit is coupled to the sensing electrode and transforms the induced charge into a pixel voltage. An input terminal of the selector is coupled to the pixel circuit. The pulse generator is coupled to the selector to generate a pulse voltage. The pixel circuit receives the pulse voltage from the pulse generator through the selector, such that at least one transistor in the pixel circuit raises hot carrier injection effect to amplify the induced charge on the sensing electrode.

According to another aspect, an embodiment of the disclosure provides an image sensing system including a plurality of charge sensors, a pixel array, a selector and a pulse generator. Each of the charge sensors includes a sensing electrode. Each of the charge sensors generates an induced charge on the sensing electrode. The pixel array includes a plurality of pixel circuits corresponding to the charge sensors. Each of the pixel circuits includes at least one transistor. Each of the pixel circuits is coupled to the sensing electrode of the corresponding charge sensor and transforms the induced charge into a pixel voltage at an output terminal of the pixel circuit. An input terminal of the selector is coupled to each of the pixel circuits in the pixel array. The pulse generator is coupled to the selector to generate a pulse voltage. Each of the pixel circuits receives the pulse voltage from the pulse generator through the selector, such that at least one transistor in each of the pixel circuits raises hot carrier injection effect to amplify the induced charge on the sensing electrode.

According to another embodiment, an embodiment of the disclosure provides an image sensing method, which is adapted to at least one pixel circuit having at least one transistor. The image sensing method includes following steps. A pulse voltage is applied to the pixel circuit, such that the transistor in the pixel circuit raises hot carrier injection effect to amplify an induced charge on a sensing electrode in a charge sensor, where the pixel circuit is coupled to the sensing electrode in the charge sensor, and the charge sensor generates the induced charge on the sensing electrode. The pixel circuit outputs a pixel voltage related to the amplified induced charge.

An embodiment of the disclosure provides a charge sensing device including a charge sensor, a semiconductor circuit, a selector and a pulse generator. The charge sensor includes a sensing electrode. The charge sensor generates an induced charge on the sensing electrode. The semiconductor circuit includes at least one transistor. The transistor in the semiconductor circuit is coupled to the sensing electrode and transforms the induced charge into a sensing voltage. An input terminal of the selector is coupled to the semiconductor circuit. The pulse generator is coupled to the selector to generate a pulse voltage. The semiconductor circuit receives the pulse voltage from the pulse generator through the selector, such that at least one transistor in the semiconductor circuit raises hot carrier injection effect to amplify the induced charge on the sensing electrode.

According to the above descriptions, in the image sensing device, the system and method thereof of the disclosure, the additionally configured pulse generator is used to generate the pulse voltage that is enough to make the transistor in the pixel circuit to raise the hot carrier injection effect, and transmit the pulse voltage to the transistor in the pixel circuit to raise the hot carrier injection effect, such that the induced charge on the sensing electrode that is connected to a gate of the transistor and located in the charge sensor is amplified. In this way, when the image sensing device is about to read the pixel voltage, the pixel circuit generates the pixel voltage according to the amplified induced charge, so as to mitigate an image reading time of the image sensing device. Moreover, when the pulse voltage is properly increased, an amplification factor of the induced charge amplified by the hot carrier injection effect is correspondingly increased. Therefore, without modifying the image readout circuit of the image sensing device, the image sensing device can be used under different applications (for example, under irradiation conditions of different X-ray intensities) by adjusting a magnitude of the pulse voltage or the pulse period. In this way, the image sensing device can obtain image information with different contrasts by adjusting the pulse voltage or pulse period, and meanwhile relax a requirement on resolution specification of the data converter in the image readout circuit, so as to reduce the cost of the image sensing device. On the other hand, besides being applied to a phototransducer, the charge sensing device of the disclosure can also be applied to different sensors capable of converting physical/chemical variations into a charge quantity, where the hot carrier injection effect raised in the transistor of the semiconductor circuit is used to properly amplify the induced charge.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In order to ensure an image sensing device (for example, an X-ray flat panel detector) that generates images through electromagnetic induction to obtain image information with good resolution and contrast in case of different application situations (for example, under different X-ray intensities), in the image sensing device of the disclosure, a circuit that makes a transistor in a pixel circuit raising a hot carrier injection effect is designed, and the circuit is near the pixel circuit used for reading each pixel voltage in the image. In this way, in the embodiment of the disclosure, hot electrons can be generated and accumulated at a gate of the transistor through the hot carrier injection effect of the transistor, so as to achieve an effect of amplifying an induced charge connected to the gate of the transistor. Therefore, the image sensing device of the disclosure can adjust an amplification factor of the induced voltage through the hot carrier injection effect in the pixel circuit, such that a data converter located at a post end of an image readout circuit is unnecessary to have a high requirement on resolution specification as that does in the related art, i.e., the requirement on resolution specification of the data converter in the image readout circuit is relaxed, so as to decrease the cost of the image readout circuit. On the other hand, besides being applied to a phototransducer, the embodiment of the disclosure can also be applied to different sensors capable of converting physical/chemical variations into a charge quantity, where the hot carrier injection effect raised at the transistor of the semiconductor circuit is used to properly amplify the induced charge. In following description, the phototransducer is taken as an example to describe various embodiments complied with the spirit of the disclosure, and those skilled in the art can also replace the phototransducer by other types of sensors capable of converting physical/chemical variations into a charge quantity.

Figure 1:
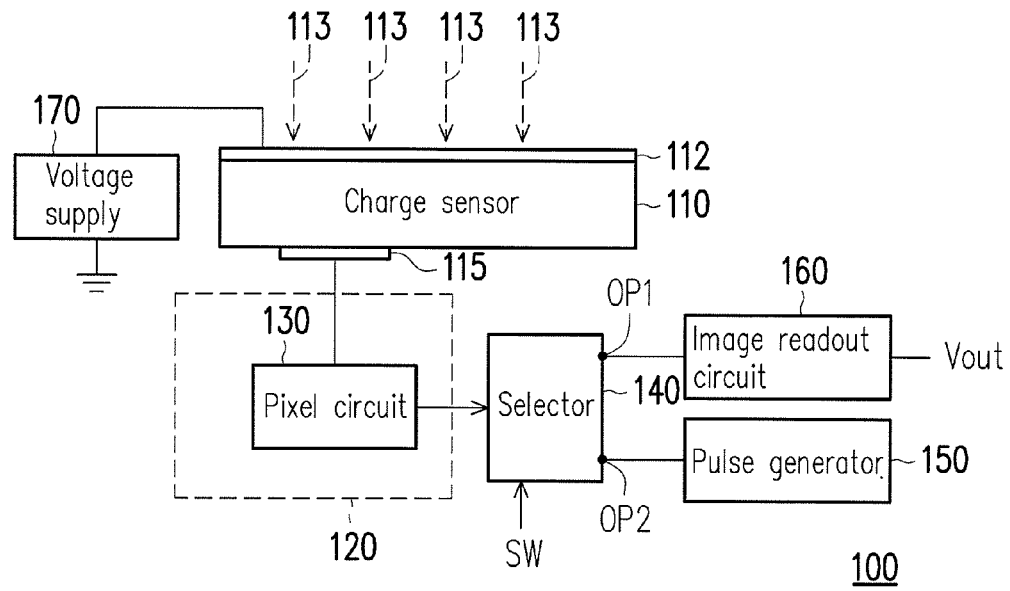
FIG. 1 is a block diagram of an image sensing device 100 according to an embodiment of the disclosure.

FIG. 1 is a block diagram of an image sensing device 100 according to an embodiment of the disclosure. The image sensing device 100 mainly includes a charge sensor 110, pixel circuits 130 located in a pixel array 120, a selector 140 and a pulse generator 150. The image sensing device 100 may further include an image readout circuit 160 and a voltage supply 170. Structures and functions of the components in the image sensing device 100 are described in detail below.

The charge sensor 110 includes a bias electrode 112 and a sensing electrode 115. The voltage supply 170 provides a voltage to the bias electrode 112, such that the charge sensor 110 receives an external X-ray 113 to generate an induced charge on the sensing electrode 112. In the present embodiment, the charge sensor 110 can be a photoconductor capable of sensing the X-ray according to an electromagnetic induction effect, or a photoconductor used for sensing other visible lights or invisible lights, and the type of the charge sensor 110 is not limited by the disclosure. For example, the charge sensor 110 in other embodiments can also be a piezoelectric sensor, a biochemical reaction sensor or other types of sensor.

Each of the pixel circuits 130 located in the pixel array 120 includes at least one transistor. The pixel circuit 130 of the present embodiment can be implemented by a transistor structure of 2T1C, 1T1C or 3T1C, and those skilled in the art can implement the pixel circuit 130 by using the well known and commonly used pixel circuit structure. In the present embodiment, a gate of one transistor in the pixel circuit 130 is coupled to the sensing electrode 112 of the charge sensor 110. The pixel circuit 130 transforms the induced charge on the sensing electrode 112 into a pixel voltage.

An input terminal of the selector 140 is coupled to an output terminal of the pixel circuit 130. The selector 140 includes a first output terminal OP1 and a second output terminal OP2, and the selector 140 couples the input terminal thereof to the first output terminal OP1 or the second output terminal OP2 according to a switching signal SW. The first output terminal OP1 of the selector 140 is coupled to an input terminal of the image readout circuit 160, and an output terminal of the pulse generator 150 is coupled to the second output terminal OP2 of the selector 140. In other words, the selector 140 receives the switching signal SW to selectively couple the output terminal of the pixel circuit 130 to the image readout circuit, or couple the output terminal of the pixel circuit 130 to the output terminal of the pulse generator 150. In the present embodiment, the selector 140 can be implemented by an analog multiplexer. On the other hand, after the image readout circuit 160 receives the pixel voltage through the selector 140, the image readout circuit 160 performs data conversion and signal amplification on the pixel voltage related to the induced charge, and outputs the pixel voltage as an output signal Vout.

It should be noticed that before each of the pixel voltages is read through the selector 140 and the image readout circuit 160, the output terminals of all of the pixel circuits 130 in the pixel array 120 can be coupled to the pulse generator 150 through the selector 140. The pulse generator 150 can generate a programmed pulse voltage to the transistor in the pixel circuit 130 at this moment. The "pulse voltage" is large enough to make the transistor in the pixel circuit 130 raising a hot carrier injection effect. In this way, the transistor in the pixel circuit 130 generates hot electrons through the hot carrier injection effect, and accumulates the same at the gate of the transistor, so as to increase the number of electrons stored by the gate, and accordingly amplify the induced charge on the sensing electrode 115. After the hot carrier injection effect of the transistor is raised, the image sensing device 100 outputs the amplified pixel voltage related to the induced charge through the selector 140 and the image readout circuit 160. Moreover, since a current generated by the hot carrier injection effect is related to an original channel current of the transistor and a strength of the exerted pulse voltage and an enable time length thereof, the image sensing device 100 of the present embodiment can adjust an amplification factor of the induced charge by controlling corresponding parameters of the pulse voltage generated by the pulse generator 150. In other words, the pulse voltage used for inducing the hot carrier injection effect of the transistor and a time length of exerting the pulse voltage can be adjusted by the pulse generator 150, so as to adjust a gain used for amplifying the induced charge.

In this way, in different applications (for example, under irradiation conditions of different X-ray intensities), the image sensing device 100 can dynamically adjusts a sensing range of the sensing image by adjusting the pulse voltage, so as to obtain image information with different contrasts and resolutions. In other words, a resolution specification of an analog-to-digital converter required by the image readout circuit 160 in the image sensing device 100 is reduced, such that in image processing, difficulty for an operator adjusting the sensing range of the image according to experiences is decreased, so as to mitigate a deviation of human processing. Moreover, the circuit structure added in the present embodiment does not influence a fill factor of the charge sensor 110 to the X-ray, and has little influence on a reading speed of the pixel circuit 130 for the pixel voltage. According to another aspect, since the image sensing device 100 of the present embodiment can amplify the induced charge on the sensing electrode 115 through the pulse voltage used for inducing the hot carrier injection effect of the transistor, an irradiation intensity of the X-ray used for irradiating an charge sensor 110 can be decreased, so as to decrease an irradiation dose of the patient to comply with the application of medical treatment and medicine. Similarly, since the image sensing device 100 of the present embodiment can implement induced charge amplification through the transistor, a requirement on resolution specification of a data processing circuit (for example, a signal amplifier or analog-to-digital converter) of the image readout circuit 160 is relaxed, so as to decrease the cost of the image sensing device 100.

Figure 2:
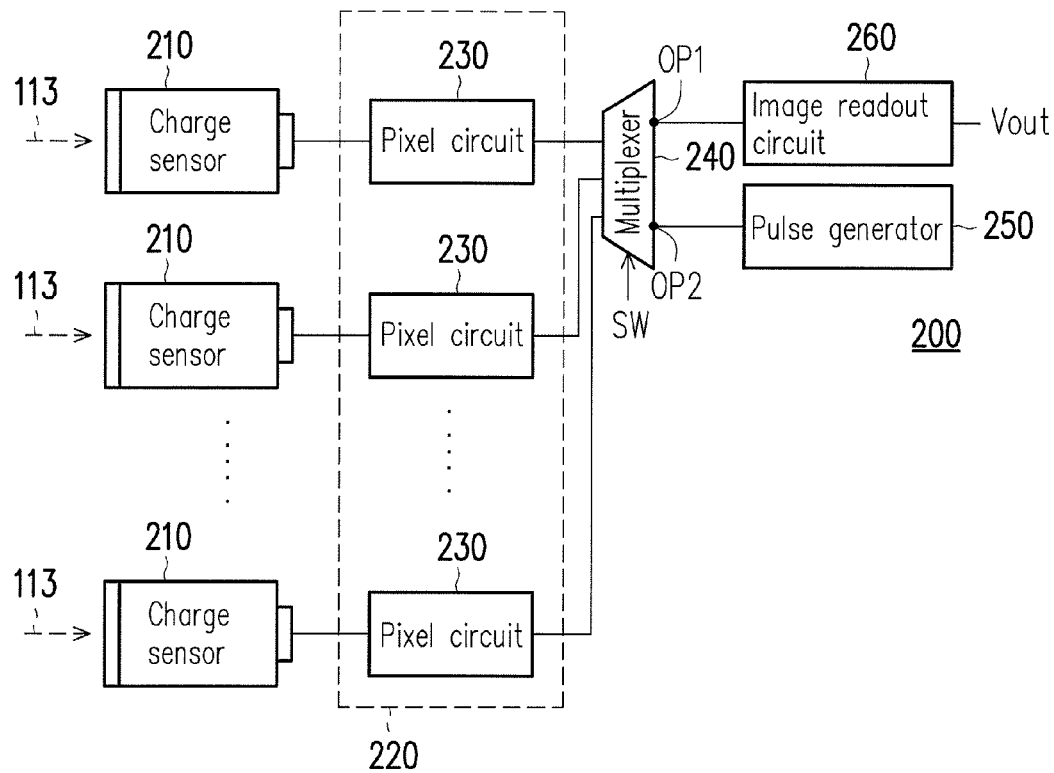
FIG. 2 is a block diagram of an image sensing system 200 according to an embodiment of the disclosure.

The image sensing device 100 of FIG. 1 is only an example of one of the embodiments of the disclosure, and other embodiments of the disclosure are described below. FIG. 2 is a block diagram of an image sensing system 200 according to an embodiment of the disclosure. The image sensing system 200 includes a plurality of charge sensors 210, a pixel array 220, a multiplexer 240, a pulse generator 250 and an image readout circuit 260. The pixel array 220 has a plurality of pixel circuits 230 corresponding to the charge sensors 210. The charge sensors 210, the pixel circuits 230, the multiplexer 240, the image readout circuit 260 and the pulse generator 250 of FIG. 2 are similar to the charge sensor 110, the pixel circuits 130, the selector 140, the image readout circuit 160 and the pulse generator 150 of FIG. 1, and details thereof are not repeated. Particularly, the pixel circuits 230 on the same pixel array 220 can simultaneously raise the hot carrier injection effect based on the pulse voltage generated by the single pulse generator 250, so as to simultaneously amplify the induced charge generated by each of the charge sensors 210.

Figure 3:
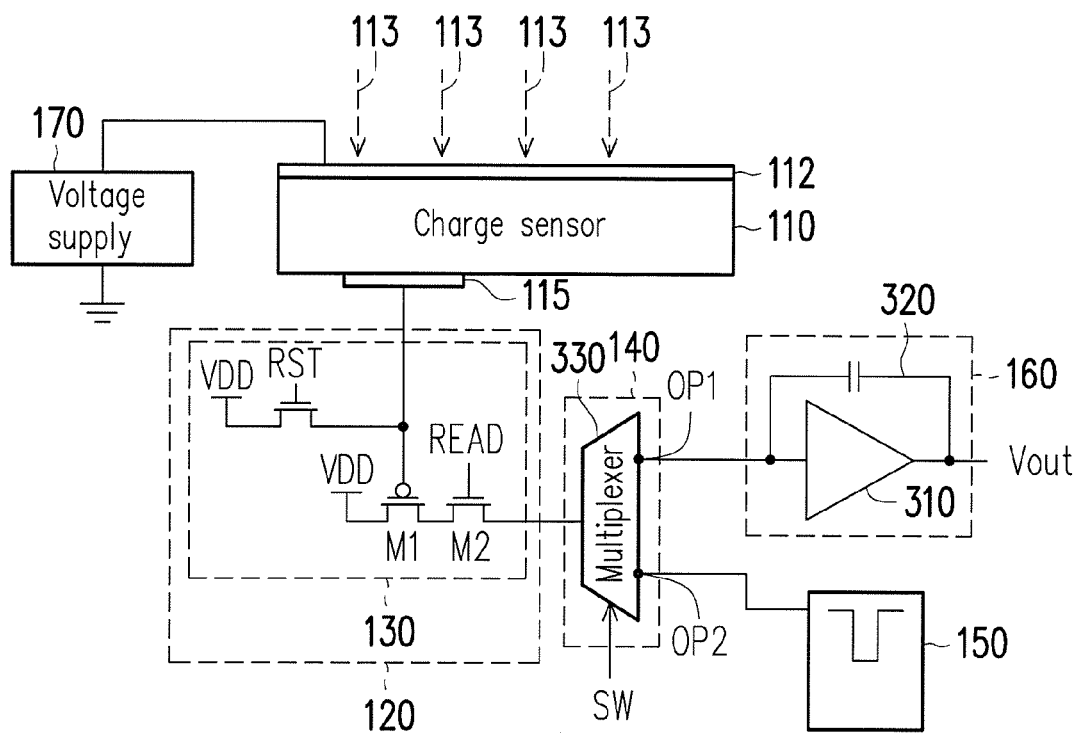
FIG. 3 is a circuit diagram of the image sensing device 100 of FIG. 1.

FIG. 3 is a circuit diagram of the image sensing device 100 of FIG. 1. Comparing FIG. 1 with FIG. 3, detailed structures of the pixel circuit 130, the selector 140 and the image readout circuit 160 are illustrated in FIG. 3. The pixel circuit 130 is a circuit structure of 3T1C, and has a first transistor M1, a second transistor M2 and a third transistor M3. A first terminal of the first transistor M1 is connected to a voltage VDD, a control terminal of the transistor M1 is connected to the sensing electrode 115 of the charge sensor 110. A first terminal of the second transistor M2 is coupled to a second terminal of the first transistor M1, a second terminal of the second transistor M2 serves as the output terminal of the pixel circuit 130, and a control terminal of the second transistor M2 receives a reading signal READ. A first terminal of the third transistor M3 is connected to the voltage VDD, a second terminal of the third transistor M3 is coupled to the sensing electrode 115, and a control terminal of the third transistor M3 receive a reset signal RST. The induced charge generated by the charge sensor 110 that receives the X-ray 113 is stored are the sensing electrode 115, and the first transistor M1 is used for converting the induced charge into a current, so as to generate the pixel voltage at the output terminal of the pixel circuit 130. When the reading signal READ is enabled, the pixel voltage is applied to the image readout circuit 260 through the selector 140. In this way, before the image sensing device 100 outputs the pixel voltage, the first transistor M1 in the pixel circuit 130 receive the pulse voltage from the pulse generator 150 through the selector 140, and the negative pulse voltage is enough to make the first transistor M1 to raise the hot carrier injection effect, so as to achieve the effect of increasing the induced charge.

The image readout circuit 160 of FIG. 3 includes a signal amplifier 310 and a capacitor 320. A first end and a second end of the capacitor 320 are respectively coupled to an input terminal and an output terminal of the signal amplifier 310. In this way, the signal amplifier 310 can amplify and convert the pixel voltage received by the image readout circuit 160 into an output voltage Vout. The selector 140 can be implemented by an analog multiplexer 330. In the present embodiment, the image sensing device 100 may further include a controller, which is configured to control the switching signal SW, the reading signal READ and the reset signal RST.

Figure 4:
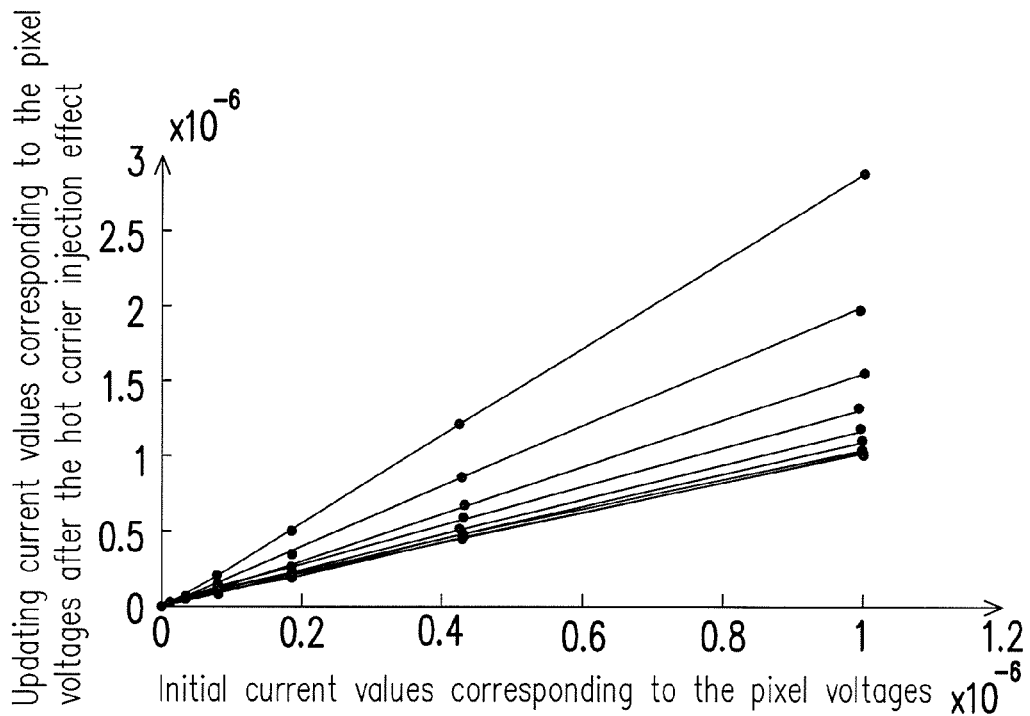
FIG. 4 is a figure of measurements obtained by applying different pulse voltage parameters to raise hot carrier injection effect of a transistor.

The image sensing device of the disclosure has been tested, measured and verified in a complementary metal oxide semiconductor (CMOS) process. FIG. 4 is a figure of measurement obtained by applying different pulse voltage parameters to raise the hot carrier injection effect of transistor. Referring to FIG. 4, a horizontal axis thereof represents initial current values corresponding to the pixel voltages, and a vertical axis thereof represents updated current values corresponding to the pixel voltages after the hot carrier injection effect is raised in response to the pulse signal. According to FIG. 4, it is learned that different strengths of the pulse voltage make an obvious change on a slop representing a current gain, and the current gain is close to be linear, such that a voltage value of the pulse voltage can adjust the amplification factor of the induced charge amplified due to the hot carrier injection effect. In this way, if the amplification factor of the induced charge is to be adjusted, it is only required to design a different pulse generator circuit outside the pixel array without increasing a structure complexity of each pixel circuit in the pixel array.

Figure 5:
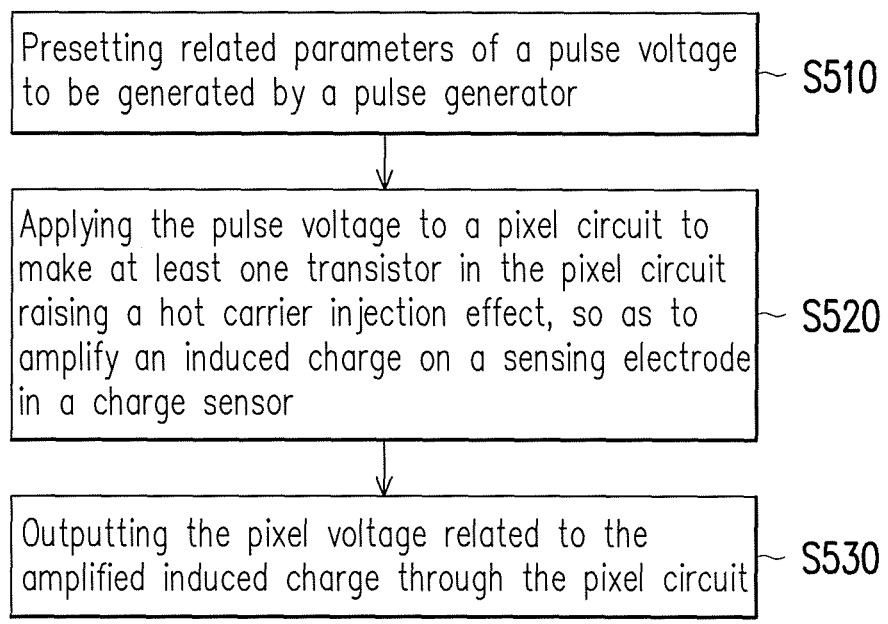
FIG. 5 is a flowchart illustrating an image sensing method according to an embodiment of the disclosure.

FIG. 5 is a flowchart illustrating an image sensing method according to an embodiment of the disclosure, and the image sensing method of the present embodiment is adapted to the image sensing device 100 of FIG. 1 and the image sensing system 200 of FIG. 2. Referring to FIG. 1 and FIG. 5, in step S510, in the image sensing device 100, related parameters (for example, a strength of the pulse voltage and an enable time length) of the pulse voltage to be generated by the pulse generator 150 are preset, so as to induce the hot carrier injection effect of the transistor in the pixel circuit 130 in a subsequent step to adjust the amplification factor of the induced charge. In step S520, the pulse generator 150 generates the pulse voltage, and the selector 140 applies the pulse voltage to the pixel circuit 130 to make at least one transistor in the pixel circuit 130 raising the hot carrier injection effect, so as to amplify the induced charge on the sensing electrode 115 of the charge sensor 110. The pixel circuit 130 is coupled to the sensing electrode 115 of the charge sensor 110, and the charge sensor 110 generates the induced charge on the sensing electrode 115. In step S530, the image sensing device 100 outputs the pixel voltage related to the amplified induced charge through the pixel circuit 130, the selector 140 and the image readout circuit 160. It should be noticed that according to the steps S510-S530, the image sensing device 100 can output a single image frame. When the image sensing device 100 is required to output continuous image frames, the image sensing device 100 sequentially and continuously executes the steps S520-S530 to obtain the continuous image frames, and the step S510 is used for setting the related parameters of the pulse voltage only one time when the image sensing device 100 is initiated. The aforementioned embodiments can be referred for detailed steps of the image sensing method of the present embodiment.

In summary, in the image sensing device, the system and method thereof of the disclosure, the additionally employed pulse generator is used to generate the pulse voltage that is large enough to make the transistor in the pixel circuit raising the hot carrier injection effect, and apply the pulse voltage to the transistor in the pixel circuit to raise the hot carrier injection effect, such that the induced charge on the sensing electrode that is connected to a gate of the transistor and located in the charge sensor is amplified. In this way, when the image sensing device is about to read the pixel voltage, the pixel circuit generates the pixel voltage according to the amplified induced charge, so as to mitigate an image reading time of the image sensing device. Moreover, when the pulse voltage is properly increased, an amplification factor of the induced charge amplified by the hot carrier injection effect is correspondingly increased. Therefore, without modifying the image readout circuit of the image sensing device, the image sensing device can be used under different applications (for example, under irradiation conditions of different X-ray intensities) by adjusting a magnitude of the pulse voltage. In this way, the image sensing device can obtain image information with different contrasts by adjusting the pulse voltage, and meanwhile relax a requirement on resolution specification of the data converter in the image readout circuit, so as to reduce the cost of the image sensing device. On the other and, besides being applied to a phototransducer, the charge sensing device of the disclosure can also be applied to different sensors capable of converting physical/chemical variations into a charge quantity, where the hot carrier injection effect raise in the transistor of the semiconductor circuit is used to properly amplify the induced charge.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An image sensing device, comprising:
   a charge sensor, comprising a sensing electrode, and adapted to generate induced charge on the sensing electrode;
   a pixel circuit, comprising at least one transistor, wherein the pixel circuit is coupled to the sensing electrode and transforms the induced charge into a pixel voltage;
   a selector, having an input terminal coupled to the pixel circuit; and
   a pulse generator, coupled to the selector to generate a pulse voltage large enough to raise hot carrier injection effect of the at least one transistor,
   wherein the pixel circuit is adapted to receive the pulse voltage through the input terminal of the selector, such that the at least one transistor raises hot carrier injection effect to amplify the induced charge on the sensing electrode.

2. The image sensing device as claimed in claim 1, wherein the input terminal of the selector is coupled to an output terminal of the pixel circuit, and the selector comprises a first output terminal and a second output terminal, and
   the image sensing device further comprises:
   an image readout circuit, coupled to the first output terminal of the selector to output the pixel voltage,
   wherein an output terminal of the pulse generate is coupled to the second output terminal of the selector, so as to apply the pulse voltage to the pixel circuit.

3. The image sensing device as claimed in claim 2, wherein the selector receives a switching signal to selectively couple the output terminal of the pixel circuit to the image readout circuit or couple the output terminal of the pixel circuit to the output terminal of the pulse generator.

4. The image sensing device as claimed in claim 2, wherein the image readout circuit comprises:

a charge sensing amplifier, configured to amplify the pixel voltage into a pixel output voltage.

5. The image sensing device as claimed in claim 1, wherein the charge sensor is a phototransducer used for sensing an X-ray according to an electromagnetic induction effect.

6. The image sensing device as claimed in claim 1, wherein the charge sensor is a phototransducer used for sensing a visible light or an invisible light.

7. The image sensing device as claimed in claim 1, wherein the selector is an analog multiplexer.

8. The image sensing device as claimed in claim 1, wherein a structure of the pixel circuit is a transistor structure of 2T1C, 1T1C or 3T1C.

9. The image sensing device as claimed in claim 1, wherein a voltage value of the pulse voltage is used to adjust an amplification factor of the induced charge amplified due to the hot carrier injection effect.

10. An image sensing system, comprising:
a plurality of charge sensors, each comprising a sensing electrode, wherein the charge sensor generates induced charge on the sensing electrode;
a pixel array, comprising:
a plurality of pixel circuits corresponding to the charge sensors, wherein each of the pixel circuits comprises at least one transistor, and is coupled to the sensing electrode of the corresponding charge sensor and transforms the induced charge into a pixel voltage at an output terminal of the pixel circuit;
a selector, having an input terminal coupled to each of the pixel circuits in the pixel array; and
a pulse generator, coupled to the selector to generate a pulse voltage large enough to raise hot carrier injection effect of the at least one transistor,
wherein each of the pixel circuits is adapted to receives the pulse voltage through the input terminal of the selector, such that the at least one transistor raises hot carrier injection effect to amplify the induced charge on the sensing electrode.

11. The image sensing system as claimed in claim 10, wherein a plurality of input terminal of the selector are respectively coupled to an output terminal of each of the pixel circuits, and the selector comprises a plurality of first output terminals and a second output terminal, and
the image sensing system further comprises:
an image readout circuit, coupled to the first output terminals of the selector to respectively output the pixel voltage of each of the pixel circuits,
wherein an output terminal of the pulse generate is coupled to the second output terminal of the selector, so as to apply the pulse voltage to each of the pixel circuits.

12. The image sensing system as claimed in claim 11, wherein the selector receives a switching signal to selectively couple the output terminal of each of the pixel circuits to the image readout circuit or couple the output terminal of each of the pixel circuits to the output terminal of the pulse generator.

13. The image sensing system as claimed in claim 11, wherein the image readout circuit comprises:
at least one charge sensing amplifier, configured to amplify each of the pixel voltages into a pixel output voltage.

14. The image sensing system as claimed in claim 10, wherein each of the charge sensors is a phototransducer used for sensing an X-ray according to an electromagnetic induction effect.

15. The image sensing system as claimed in claim 10, wherein the charge sensor is a phototransducer used for sensing a visible light or an invisible light.

16. The image sensing system as claimed in claim 10, wherein the selector is an analog multiplexer.

17. The image sensing system as claimed in claim 10, wherein a structure of the pixel circuit is a transistor structure of 2T1C, 1T1C or 3T1C.

18. The image sensing system as claimed in claim 10, wherein a voltage value of the pulse voltage is used to adjust an amplification factor of the induced charge amplified due to the hot carrier injection effect.

19. An image sensing method, adapted to at least one pixel circuit having at least one transistor, the image sensing method comprising:
applying a pulse voltage large enough to raise hot carrier injection effect of the at least one transistor to the at least one pixel circuit, such that the at least one transistor in the at least one pixel circuit raises hot carrier injection effect to amplify an induced charge on a sensing electrode in a charge sensor, wherein the at least one pixel circuit is coupled to the sensing electrode in the charge sensor, and the charge sensor generates the induced charge on the sensing electrode; and
outputting a pixel voltage related to the amplified induced charge through the at least one pixel circuit.

20. The image sensing method as claimed in claim 19, further comprising:
amplifying the pixel voltage into a pixel output voltage.

21. The image sensing method as claimed in claim 19, wherein the charge sensor is a phototransducer used for sensing an X-ray according to an electromagnetic induction effect.

22. The image sensing method as claimed in claim 19, wherein the charge sensor is a phototransducer used for sensing a visible light or an invisible light.

23. The image sensing method as claimed in claim 19, wherein a voltage value of the pulse voltage is used to adjust an amplification factor of the induced charge amplified due to the hot carrier injection effect.

24. A charge sensing device, comprising:
a charge sensor, comprising a sensing electrode, wherein the charge sensor generates an induced charge on the sensing electrode;
a semiconductor circuit, comprising at least one transistor, wherein the at least one transistor in the semiconductor circuit is coupled to the sensing electrode and transforms the induced charge into a sensing voltage or a sensing current;
a selector, having an input terminal coupled to the semiconductor circuit; and
a pulse generator, coupled to the selector to generate a pulse voltage large enough to raise hot carrier injection effect of the at least one transistor,
wherein the semiconductor circuit receives the pulse voltage from the pulse generator through the input terminal of the selector, such that the at least one transistor in the semiconductor circuit raises a hot carrier injection effect to amplify the induced charge on the sensing electrode.

* * * * *